United States Patent [19]

Randall

[11] 4,264,812

[45] Apr. 28, 1981

[54] METHOD FOR DETERMINING THE ABSORPTION CROSS SECTION OF SMALL FLUID SAMPLES

[75] Inventor: Russel R. Randall, Houston, Tex.

[73] Assignee: Dresser Industries, Inc., Dallas, Tex.

[21] Appl. No.: 94,395

[22] Filed: Nov. 14, 1979

[51] Int. Cl.$^3$ .................... G01V 5/00; G01D 18/00
[52] U.S. Cl. ............................... 250/255; 250/252
[58] Field of Search ............. 250/252, 253, 255, 264, 250/269

[56] References Cited

U.S. PATENT DOCUMENTS

| 3,379,882 | 4/1968 | Youmans | 250/264 |
|---|---|---|---|
| 3,558,888 | 1/1971 | Youmans | 250/269 |
| 3,914,603 | 10/1975 | Paap et al. | 250/269 |

OTHER PUBLICATIONS

Randall et al. "A Study of the Effects of Diffusion on Pulsed Neutron Capture Logs" Journal of Petroleum Tech. Dec. 1978 pp. 1788–1794.

*Primary Examiner*—Alfred E. Smith
*Assistant Examiner*—Janice A. Howell
*Attorney, Agent, or Firm*—Richard M. Byron

[57] ABSTRACT

A source of fast neutrons and a detector responsive to the thermal neutron population decay rate are utilized in a well logging instrument. The instrument is placed within a sample retention chamber. The neutron generator is periodically pulsed and the neutron detector is gated on at intervals of 100–150, 150–200, and 800–850 microseconds, respectively, following the termination of each burst of fast neutrons. The detected radiations within these intervals are used to indicate the apparent absorption cross section of the small fluid sample within the chamber. The absorption cross section is measured for a number of small samples of known salinity and calculatable true absorption cross section. A relationship is constructed of the true absorption cross section of the samples versus the measured absorption cross sections of the samples. When the chamber is filled with an unknown fluid sample the measured absorption cross section is correlated with the reference curve which will yield single unique true absorption cross section substantially free of diffusion effects for the measured absorption cross section value of the unknown small quantity sample.

7 Claims, 4 Drawing Figures

METHOD FOR DETERMINING THE ABSORPTION CROSS SECTION OF SMALL FLUID SAMPLES

BACKGROUND OF THE INVENTION

This invention relates to the art of geophysical prospecting in general, to the art of radioactivity well logging in particular, and more particularly to a method for determining the true absorption cross section for small quantities of water.

It is known in the art to irradiate the formations for a period of time sufficient to activate an appreciable number of nuclei of material in the formations, thereby rendering the material artifically radioactive, and at an interval of time following the cessation of the radiation to measure the artificial radioactivity. In U.S. Pat. No. 3,379,882, issued to A. H. Youmans and assigned to the assignee of the present invention, there is described one system for radioactivity well logging wherein the formations are irradiated with neutrons from a periodically varying source operating at a repetition rate of the order of magnitude of hundreds or thousands of cycles per second, being thus alternately on and off for periods of hundreds of microseconds. A detector is synchronized with the source to measure returning radiations while the source is off. Such an instrument is used for measuring the absorption cross section ($\Sigma$) of the material surrounding the source and detector. The absorption cross section is a measure of the rate at which thermal neutrons are captured in the material surrounding the instrument.

One use for the above described system has been in log-inject-log. As described in U.S. Pat. No. 3,558,888, issued to A. H. Youmans and assigned to the assignee of the present application, such a logging method can comprise injecting into a subsurface earth formation a fluid having a preselected thermal neutron absorption cross section. Log-inject-log allows one to detect where the fluid is going for the first few feet of formation where the fluid is injected. The solution used by this method is made up by combining with water a known amount of sodium-cloride to provide a salt-water solution for which can be calculated the absorption cross section. It is not unknown to be required to mix more than one quantity of such injection fluid and further it is not uncommon for the absorption cross section to differ slightly from one mixture to the next. One means of controlling the quality of injection fluid would be to measure the absorption cross section of each mixture to determine that the absorption cross sections are constant throughout all the mixtures.

A related problem is encountered in that it has proven to be extremely difficult in the prior art to measure the absorption cross section of very small fluid samples. This difficulty is based on two facts. The absorption cross section of fluids is not based solely on the salinity of the fluid. Impurities, such as trace amounts of boron, can significantly alter the absorption cross section making a measurement unreliable. A second difficulty in determining the absorption cross section of small fluid samples is that there are unique diffusion effects which will alter the neutron decay rate. These diffusion effects will cause to be measured a modified decay rate which is not exactly the true absorption cross section of the fluid samples particularly where small quantities are involved.

These and other disadvantages are overcome with the present invention by providing a method and apparatus for determining the true absorption cross section of small fluid samples based on a unique relationship of various fluid samples as long as the water concentrations of the samples are maintained relative constant.

SUMMARY OF THE INVENTION

In a preferred embodiment of the invention, a well logging system is provided which in its overall concept includes an elongated housing which utilizes a source of pulsed neutrons and a radiation detector spaced apart from the source. The instrument is placed so that the source and detector are surrounded by a sample chamber designed to contain a fixed small quantity of fluid. The chamber is filled with water of a known salinity, for which absorption cross section has been calculated.

With the instrument surrounded by the sample the source is activated, thus bombarding the fluid sample with neutrons. The radiation returning to the detector is measured during two relatively short gate intervals set within a few hundred microseconds after the source is turned off. A third gate which detects background radiation is used and the resulting background radiation measured is removed from the previous two measurement gates. The detected radiations within the two measurement gate intervals are then used to calculate the apparent absorption cross section for the sample. Thus, there is provided for the sample a true calculated absorption cross section which has a unique relationship to the apparent measured absorption cross section for the sample.

The above process is repeated a number of times using different fluid samples of known salinity and thus calculatable absorption cross sections. The accumulation of sample measurements provides a series of unique relationships where for every measured apparent absorption cross section a unique true absorption cross section can be found.

Once the unique relationship function has been determined the sample chamber can be filled with a fluid of unknown absorption cross section. Such sample can be representative of the formation fluid extracted from a well or it can represent the fluid solution to be used in a log-inject-log operation. The apparent absorption cross section of the fluid sample is measured as above and this value compared to the reference function derived from measuring the samples of known absorption cross section.

This correlation yields the true absorption cross section based on the measured, apparent absorption cross section.

It is yet another feature of the present invention to provide method and apparatus for the elimination of diffusion effects when measuring the absorption cross section for small fluid samples.

A particular feature of the present invention is to provide method and apparatus for measuring the apparent absorption cross sections of a plurality of small water samples of known salinity of which the true absorption cross section has calculated. The apparent absorption cross section of an unknown water sample is then measured and compared to the measured reference values to provide the true absorption cross section for the unknown sample.

These and other features and advantages of the present invention can be understood from the following description of several techniques of producing the invention described in conjunction with the following drawings.

DETAILED DESCRIPTION OF THE DRAWINGS

Figure 1:
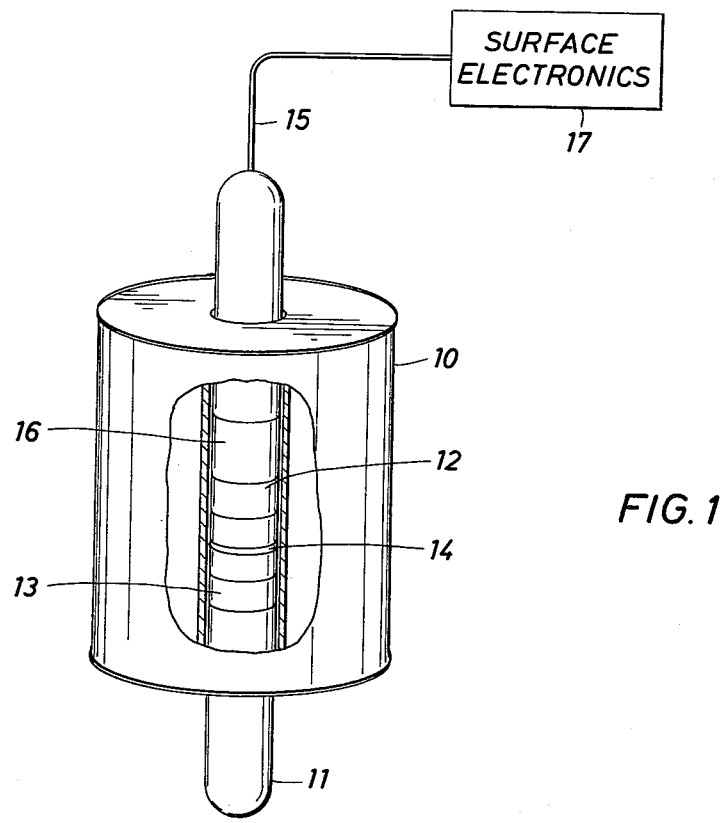
FIG. 1 is a simplified functional overall representation, partially in cut-away, of an embodiment of the present invention.

Referring now to the drawings in more detail, particularly to FIG. 1, there is illustrated schematically a radioactivity well surveying operation in accordance with the present invention. A sample chamber 10 designed to be filled with a small quantity of fluid is shown. Disposed within sample chamber 10 is radioactivity surveying instrument 11. Instrument 11 comprises a detecting system 12 and a conventional pulsed neutron source 13 separated from detector 12 by shielding 14. Cable 15 contains the required conductors to electrically connect internal electronics 16 of instrument 11 with external electronics 17.

In the operation of the apparatus of FIG. 1, neutrons from source 13 irradiate the contents of fluid sample chamber 10, which contains a small fluid sample in the range of 5 to 8 gallons. The radiations influenced by the fluid sample are detected by detecting system 12. The resultant signals are processed in subsurface electronics 16, described in greater detail hereinafter. These signals are sent to surface electronics 17 through cable 15. The elements are shown diagrammatically, and it is to be understood that the associated circuits and power supplies are provided in a conventional manner.

As is well known in the art of radioactivity logging, the medium surrounding the instrument 11 is irradiated by neutrons from neutron source 13, for example, a D-T accelerator. These neutrons participate in elastic and inelastic collisions with the atoms contained in the medium, in this instance the fluid sample contained in chamber 10. The secondary radiation resulting from bombardment by the primary radiation in the form of neutrons from source 13 is detected by radiation detector 12. The measurement of the decline of the thermal neutron population provides a means for determining the apparent absorption cross section of the fluid sample within chamber 10.

Figure 2:
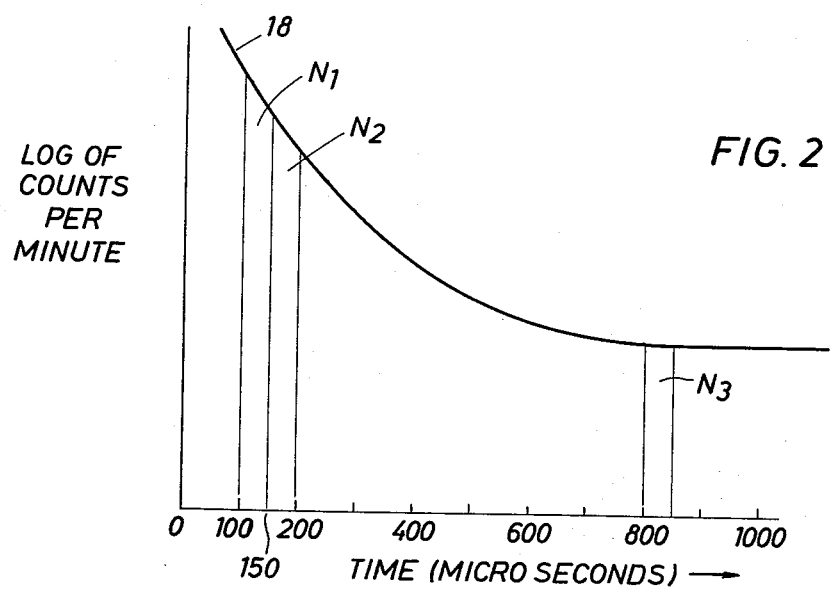
FIG. 2 is a schematic representation of three gated intervals within the thermal neutron decay curve.

FIG. 2 illustrates a counting rate curve 18 which is exemplary of the decline of the thermal neutron population in the fluid sample following each neutron source burst. The counting rates $N_1$, $N_2$, and $N_3$ are taken, respectively, during the periods of 100-150, 150-200, and 800-850 microseconds after each neutron pulse. Gate intervals $N_1$ and $N_2$ provide information relating to the absorption cross section of the fluid sample where as gate interval $N_3$ measures background effects. This background may be due to the detection of gamma rays resulting from $N^{16}$ induced in the fluids by interaction with neutrons from the source. Similarly, artificial radioactivity may be induced in the scintillation crystal of detector 12. It is to be understood that the specific time periods of gate intervals $N_1$, $N_2$, and $N_3$ are for purposes of illustration only and are not to be construed as limiting the invention.

Figure 3:
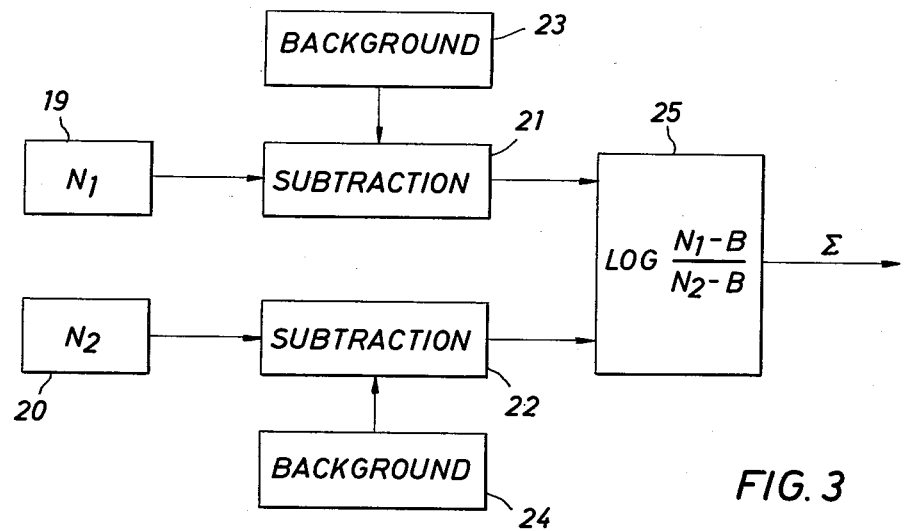
FIG. 3 is a graphic representation of the measured absorption cross section versus intrensic absorption cross section derived from controlled water samples.

FIG. 3 shows in block diagram the circuitry for deriving the absorption cross section, $\Sigma$, in an operation according to the present invention. In this figure, blocks 19 and 20 represent the output of counting rate meters responsive, respectively, to the radiation induced pulses detected during gate intervals $N_1$ and $N_2$. Blocks 21 and 22 are conventional subtraction circuits, coupled respectively to the outputs of blocks 19 and 20. The subtraction circuit 21 has as another input the output of the box entitled "BACKGROUND" and generally bearing the legend 23. A similar such background circuit 24 is connected to the second input of subtraction circuit 22. The outputs of the two subtraction circuits 21 and 22 are connected into a logarithmic circuit 25 which produces a signal based upon the logarithmic of $$N_1 - B/N_2 - B$$

where "B" represents the background. The output of logarithmic circuit 25 is indicative of the measured absorption cross section of the sample under test.

Figure 4:
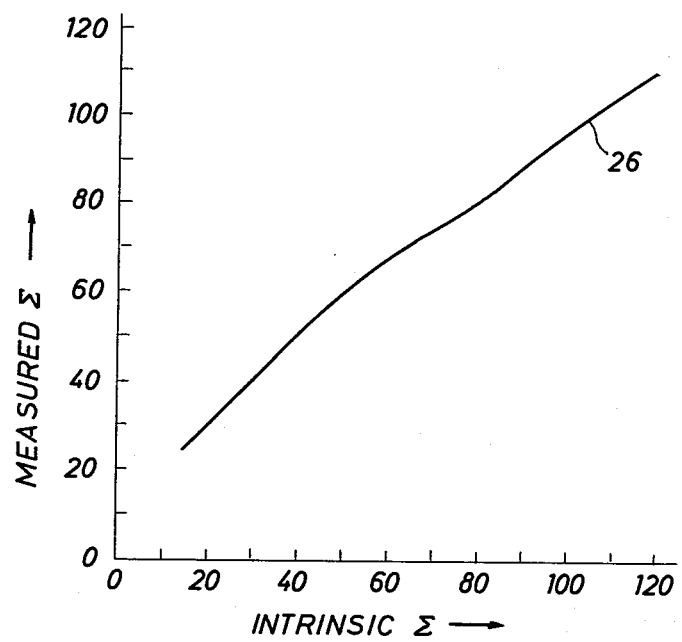
FIG. 4 is a block diagram illustrating apparatus for providing the three gated detection intervals following each neutron pulse.

Referring now to FIG. 4, there is illustrated a graphic representation showing how true absorption cross section can be determined from a measurement of the apparent absorption cross section of a small fluid sample. The actual measured absorption cross section is shown on the vertical axis, whereas the intrinsic or true absorption is shown on the horizontal axis. To practice the present invention a first fluid sample is placed within chamber 10 of FIG. 1. This sample will have a known salinity and thus a calculatable absorption cross section using the formula:

$$\Sigma = N_i\sigma_i + N_2\sigma_2 + \ldots + N_k\sigma_k$$

for k elements;
where $N_i$=number density of $i^{th}$ element
and $\sigma_i$=microscopic absorption cross section of $i^{th}$ element.

As described previously, the sample is bombarded with neutrons from source 13 of instrument 11 and the radiation returning to detector 12 is measured. The measured absorption cross section is plotted versus the calculated intrinsic absorption cross section of the sample. The process of irradiating a sample of known absorption cross section is repeated using a plurality of samples of different salinity. The results are illustrated by curve 19, of FIG. 4, which illustrates a functional relationship between the measured absorption cross section and the intrinsic cross section of fluid samples tested in sample chamber 10.

To determine the true absorption cross section of an unknown small fluid sample, whether it be a saline mixture for log-inject-log operations or a sample of formation waters, the unknown sample is placed within chamber 10. As hereinbefore described, the absorption cross section of the sample is measured as a result of detecting radiation resulting from neutron bombardment. The measured apparent absorption cross section is then correlated to reference curve 19. The correlation will yield a unique value representing the intrinsic absorption cross section. The intrinsic value will be substantially independent of diffusion effects which are relative constant so long as the water concentration of the small sample remains substantially constant.

Many modifications and variations besides those specifically mentioned may be made in the techniques and structures described herein and depicted in the accompanying drawings without departing substantially from the concept of the present invention. For example, instead of using a pulsed neutron source as herein disclosed it is possible to use a steady state neutron source or instead of detecting gamma rays returning to the detector, a measurement could be made of the neutrons impinging a detector. Accordingly, it should be clearly understood that the forms of the invention described and illustrated herein are exemplary only, and are not intended as limitations on the scope of the present invention.

The embodiments of the invention in which an exclusive property or privilege is claimed are defined as follows:

1. A method for evaluating the absorption cross section for a small quantity water sample, comprising:
   measuring the absorption cross section for each of a plurality of small water samples of known salinity;
   calculating the corresponding true absorption cross section for each of said plurality of samples;
   producing a functional relationship between said measured absorption cross sections and said corresponding true absorption cross sections;
   measuring the absorption cross section for a small water sample of unknown salinity;
   equating said measured absorption cross section of said unknown sample to said absorption cross section function; and
   evaluating the true absorption cross section of said unknown small water sample based on said equated measured absorption cross sections.

2. A method for estimating, independent of diffusion effects, the absorption cross section for a small quantity water sample, comprising:
   measuring the absorption cross section including diffusion effects for each of a series of small water samples of various, known salinity;
   calculating the corresponding actual absorption cross section independent of diffusion effects for each of said series of samples;
   developing a continuous functional relationship between said series of measured absorption cross sections and said true absorption cross sections;
   measuring the absorption cross section for a small water sample of unknown characteristic;
   equating said measured absorption cross section of said unknown sample to said measured absorption cross section of said series of known samples; and
   estimating the absorption cross section, independent of diffusion effects, for said unknown sample from said functional relationship of said series of measured absorption cross sections and said true absorption cross section.

3. The method of claim 1 or 2, wherein said small water sample is of a predetermined quantity of approximately 5-8 gallons.

4. The method of claim 3 wherein said radiations are detected within three independent gate intervals.

5. The method of claim 4, wherein said gate intervals are from 100-150, 150-200, and 800-850 microseconds, respectively, following said neutron irradiation.

6. A radioactivity method for evaluating the true absorption cross section for a small sample of formation water, comprising:
   irradiating a series of samples of known absorption cross section values with neutrons;
   detecting the radiations caused by said irradiating;
   generating from said detected radiations a series of absorption cross section measurements functionally related to said known absorption cross section values;
   irradiating a sample of formation water with neutrons;
   detecting the radiations caused by irradiating said formation water sample;
   generating an absorption cross section measurement for said formation water sample; and
   estimating the true absorption cross section for said formation water sample by correlation to said functional relationship generated from said series of known samples.

7. The method of claim 6, wherein the first, second, and third gates are equal in time duration and the first and second gate intervals are contiguous.

* * * * *